(12) United States Patent
Ferreira et al.

(10) Patent No.: US 11,461,108 B2
(45) Date of Patent: Oct. 4, 2022

(54) USE OF DRIVER AND WIRED CONNECTION TO DIAGNOSE DEVICE USING DISK IMAGE

(71) Applicant: Lenovo (Singapore) Pte. Ltd., Singapore (SG)

(72) Inventors: Marcelo da Costa Ferreira, São Paulo (BR); Mauri Carvalho, São Paulo (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 110 days.

(21) Appl. No.: 17/067,325

(22) Filed: Oct. 9, 2020

(65) Prior Publication Data
US 2022/0113984 A1 Apr. 14, 2022

(51) Int. Cl.
*G06F 9/4401* (2018.01)
*H04L 9/32* (2006.01)

(52) U.S. Cl.
CPC .......... *G06F 9/4411* (2013.01); *H04L 9/3247* (2013.01)

(58) Field of Classification Search
CPC .. G06F 9/4411; G06F 11/3051; G06F 13/385; G06F 21/575; H04L 9/3247
See application file for complete search history.

(56) References Cited

U.S. PATENT DOCUMENTS

| | | | | |
|---|---|---|---|---|
| 6,785,807 B1* | 8/2004 | Aguilar | | G06F 11/2294 710/63 |
| 8,949,588 B1* | 2/2015 | Ye | | G06F 21/568 713/2 |
| 9,064,117 B1* | 6/2015 | Worsley | | G06F 9/441 |
| RE47,533 E * | 7/2019 | Bartlett | | H04W 12/12 |
| 10,372,660 B2* | 8/2019 | Huang | | G06F 13/4022 |
| 2003/0093658 A1 | 5/2003 | Wen et al. | | |
| 2004/0059907 A1 | 3/2004 | Cochran et al. | | |
| 2006/0168576 A1* | 7/2006 | Phung | | G06F 8/65 717/168 |
| 2008/0168310 A1* | 7/2008 | Saretto | | G06F 11/1417 714/E11.02 |

(Continued)

OTHER PUBLICATIONS

"Boot Image", Wikipedia, retrieved Sep. 4, 2020 from https://en.wikipedia.org/wiki/Boot_image.

(Continued)

*Primary Examiner* — Aurel Prifti
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to load a driver responsive to a boot command, where the driver may be loaded prior to the first device loading a guest operating system (GOS) stored at the first device. The instructions may then be executable to use the driver to communicate with a second device to receive a disk image over a wired connection to the second device. The instructions may be further executable to continue booting the first device using the disk image rather than the GOS and to, responsive to the first device being booted using the disk image, communicate with the second device over the wired connection to diagnose one or more issues with the first device.

16 Claims, 13 Drawing Sheets

(56) References Cited

U.S. PATENT DOCUMENTS

| | | | | |
|---|---|---|---|---|
| 2009/0181662 | A1* | 7/2009 | Fleischman | H04W 8/265 455/419 |
| 2009/0287915 | A1* | 11/2009 | Gattegno | G06F 9/4416 713/2 |
| 2011/0087920 | A1* | 4/2011 | Hendricks | H04L 9/3247 714/21 |
| 2012/0047227 | A1* | 2/2012 | Haggerty | H04W 8/183 709/217 |
| 2015/0032248 | A1* | 1/2015 | Bauer | G05B 19/4065 700/159 |
| 2016/0117747 | A1* | 4/2016 | Thielen | G06Q 30/0621 705/26.5 |
| 2016/0170932 | A1* | 6/2016 | Lin | G06F 13/4282 710/313 |
| 2017/0177459 | A1* | 6/2017 | Salomon | G06F 11/3006 |
| 2018/0060270 | A1* | 3/2018 | Schnell | G06F 13/4022 |
| 2018/0275998 | A1* | 9/2018 | Hanson | G06F 3/038 |
| 2019/0042387 | A1* | 2/2019 | Aloni | G06F 9/452 |
| 2019/0121647 | A1* | 4/2019 | Por | G06F 9/4411 |
| 2019/0235890 | A1* | 8/2019 | Schnoor | G06F 13/4068 |
| 2019/0356529 | A1* | 11/2019 | Gulati | H04L 9/3265 |
| 2020/0074064 | A1* | 3/2020 | Chen | G06F 21/34 |
| 2020/0117472 | A1* | 4/2020 | Willoughby | G06F 9/4408 |
| 2020/0257601 | A1* | 8/2020 | Srivastava | G06F 11/2294 |
| 2021/0073003 | A1* | 3/2021 | Jacquin | G06F 9/4411 |
| 2021/0405887 | A1* | 12/2021 | Xiong | G06F 11/1096 |
| 2022/0027519 | A1* | 1/2022 | Kataria | H04L 63/10 |

OTHER PUBLICATIONS

"Disk Image", Wikipedia, retrieved on Sep. 4, 2020 from https://en.wikipedia.org/wiki/Disk_image.

"ISO Image", Wikipedia, retrieved on Sep. 4, 2020 from https://en.wikipedia.org/wiki/ISO_image.

* cited by examiner

USE OF DRIVER AND WIRED CONNECTION TO DIAGNOSE DEVICE USING DISK IMAGE

FIELD

The present application relates to technically inventive, non-routine solutions that are necessarily rooted in computer technology and that produce concrete technical improvements.

BACKGROUND

As recognized herein, when a technician attempts to repair a personal computer (PC) for someone, an Internet connection to get access to the PC might not be available if, for example, the problem with the PC relates to network interface software or hardware. As also recognized herein, even if the technician is physically present at the PC itself, sometimes the problem with the PC might be a malfunctioning display and as such, the technician might believe the entire PC is defective, unusable and/or unresponsive if the display fails to present any content. Moreover, even if the technician does not believe the entire PC is defective despite a display malfunction, the technician still might not be able to address the problem itself since the technician may not be able to see anything being presented on the defective display.

As also recognized herein, remote connections of other devices to the PC to address problems with the PC can in many instances require rooting the other device for such communication. However, rooting the other device can be difficult, burdensome, and create security flaws and other issues.

There are currently no adequate solutions to the foregoing computer-related, technological problem.

SUMMARY

Accordingly, in one aspect a first device includes at least one processor and storage accessible to the at least one processor. The storage includes instructions executable by the at least one processor to load a driver responsive to a boot command, where the driver is loaded prior to the first device loading a guest operating system (GOS) stored at the first device. The instructions are also executable to use the driver to communicate with a second device to receive a disk image over a wired connection to the second device. The second device is different from the first device. The instructions are further executable to continue booting the first device using the disk image rather than the GOS and to, responsive to the first device being booted using the disk image, communicate with the second device over the wired connection to diagnose one or more issues with the first device.

In some example implementations, the instructions may be executable to use the driver to detect the wired connection of the first device with the second device, and then to communicate with the second device to receive the disk image over the wired connection responsive to detecting the wired connection.

Also in some example implementations, the instructions may be executable to, responsive to the first device being booted using the disk image, communicate with the second device over the wired connection for diagnosing and also fixing the one or more issues with the first device.

In some examples, the GOS may be a first GOS, and the disk image may include a second GOS used to continue booting the device. So, for example, the driver may be used to communicate with the second device to indicate, to the second device, a particular GOS version to include in the disk image that is received by the first device.

In various example embodiments, the first device may communicate with the second device using a standardized communication protocol. Additionally, the driver may be a Unified Extensible Firmware Interface (UEFI) driver and the wired connection may include a universal serial bus (USB) wired connection. Also in some examples, the driver may be stored locally at the first device for pre-GOS execution to communicate with the second device over the wired connection.

Still further, in some example implementations the instructions may be executable to identify a digital signature communicated over the wired connection by the second device, to attempt to verify the digital signature, and to load the disk image and continue booting the first device using the disk image responsive to verifying the digital signature.

In another aspect, a method includes loading a driver at a first device responsive to receiving a boot command at the first device. The method also includes using the driver to communicate with a second device to receive a disk image. The second device is different from the first device. The method then includes booting the first device using the disk image rather than a guest operating system (GOS) stored at the first device, and communicating with the second device to diagnose one or more issues with the first device responsive to the first device being booted using the disk image.

In some examples, the driver may be a Unified Extensible Firmware Interface (UEFI) driver. Also, the driver may be loaded prior to the first device loading the GOS stored at the first device.

Additionally, in some examples the method may include using the driver to communicate over a wired connection with the second device to receive the disk image. The wired connection may include a universal serial bus (USB) wired connection, for example.

Still further, if desired the method may include using the driver to detect a wired connection between the first device and the second device and, responsive to detecting the wired connection, communicating with the second device to verify a digital signature and to receive the disk image over the wired connection.

In still another aspect, at least one computer readable storage medium (CRSM) that is not a transitory signal includes instructions executable by at least one processor. The instructions are executable to detect, at a first device, a wired connection to a second device different from the first device. The instructions are then executable to transmit a disk image to the second device over the wired connection based on detecting the wired connection. The instructions are further executable to control, from the first device and over the wired connection, execution of the disk image as loaded at the second device to diagnose and attempt to fix one or more problems with the second device.

So, for example, the first device may be a mobile device and the wired connection may include a universal serial bus (USB) wired connection. The disk image as transmitted to the second device may even be digitally signed by the first device in some examples.

Additionally, in some example implementations the instructions may be executable to present, on a display accessible to the first device, a graphical user interface (GUI) that includes a selector. The selector may be selectable to authorize communication of the first device with the second device over the wired connection to transmit the disk image. The GUI may be presented responsive to the detecting of the wired connection to the second device. In these example implementations, the instructions may then be executable to transmit the disk image to the second device based on selection of the selector.

Still further, in some example embodiments the disk image may include a guest operating system (GOS) to load at the second device. In these examples, the first device may control execution of the GOS as loaded at the second device to diagnose and attempt to fix the one or more problems with the second device.

The details of present principles, both as to their structure and operation, can best be understood in reference to the accompanying drawings, in which like reference numerals refer to like parts, and in which:

DETAILED DESCRIPTION

Figure 1:
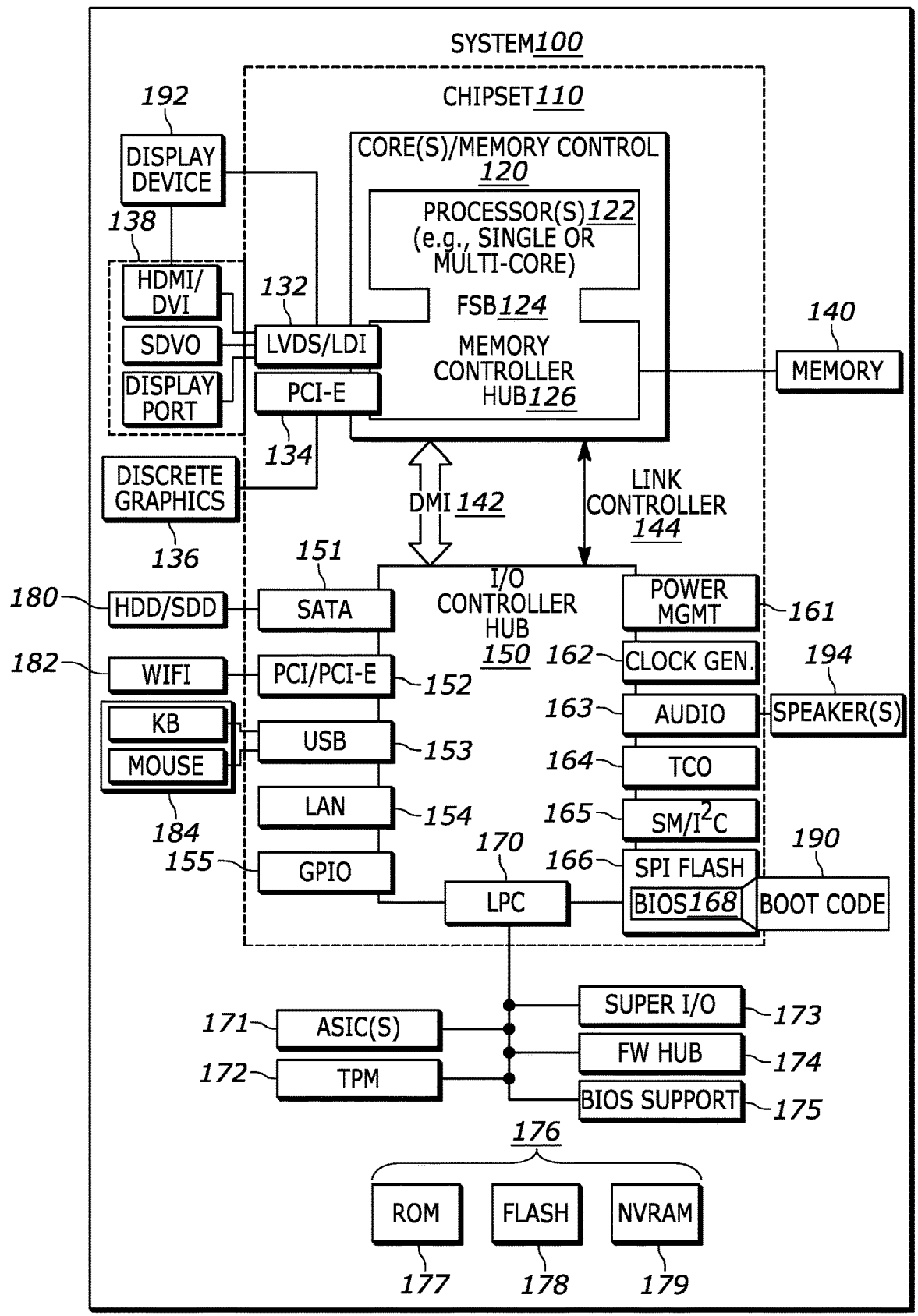
FIG. 1 is a block diagram of an example system consistent with present principles.

Among other things, the present disclosure discusses two pieces of software. One may reside at a system BIOS (e.g., UEFI) of a first device and may have the responsibility of detecting an attached second device that would be able to send an image to be booted by the first device to check/diagnose the first device. This piece of software may use a standard file-sharing protocol such as Android AOA. This software may be placed at the initial stages of the BIOS boot process to interrupt the boot process, e.g., prior to the first device's guest operating system (GOS) being loaded.

The other piece of software may reside on the second device and may have the capability to send an image to the first device over a wired connection, also using the standard file-sharing protocol, without having to change the second device's GOS itself but rather just by using a non-intrusive application executing on top of the second device's GOS. Thus, the non-intrusive application may be configured to send and receive commands and data via the standard safe-sharing protocol and the wired connection. As such, there would not necessarily be a need to alter the GOS of the second device, such as by rooting the second device to enable some specific feature that is not present at the GOS level in order to diagnose the first device. In doing so, device security may still be maintained while also still protecting user-sensitive data.

Thus, a mobile device like a smartphone may be converted, without modifications to its guest operating system, into a boot device to run an EFI or other diagnostic to address another defective device. To do so, a user interface may be provided at the mobile device to control the diagnostic executions. By using the mobile device to boot the defective machine and run diagnostics using a boot image sent over a USB channel, a technician or system administrator may locate and solve hardware and software problems via a wired connection between the two devices.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces/ports 153, a LAN interface 154 (more generally a network interface for communication over at least one network such as the Internet, a WAN, a LAN, a Bluetooth network using Bluetooth 5.0 communication, etc.

under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Note that in some examples, BIOS may be a set of routines stored in read-only memory that enables a computer to start a guest operating system and to communicate with the various devices in a system, such as disk drives, keyboards, displays/monitors, printers, and communications ports. In one embodiment, functions performed by BIOS may also be performed by other higher level software application programs. In another embodiment, BIOS may be a Unified Extensible Firmware Interface (UEFI), which in a healthy computer may assist in control handoff of a computer system to an operating system during a pre-boot environment (e.g., after the computer system is powered on, but before the guest operating system starts).

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
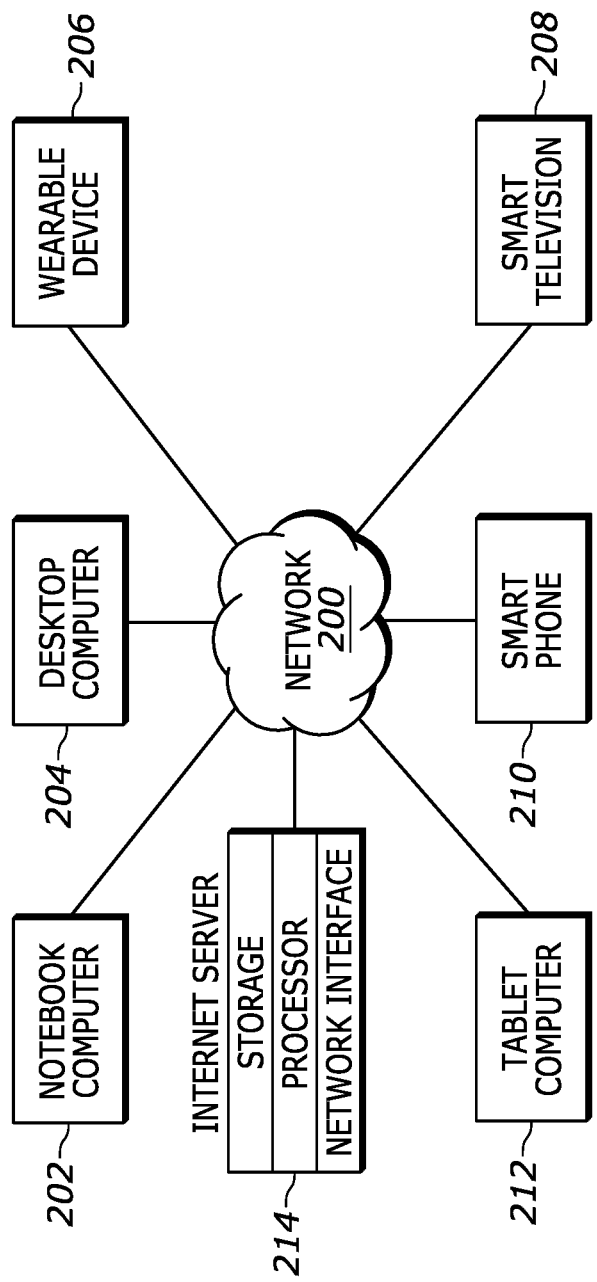
FIG. 2 is a block diagram of an example network of devices consistent with present principles.

Turning now to FIG. 2, example devices are shown communicating over a network 200 such as the Internet in accordance with present principles, e.g., to download disk images. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles. For example, any of the devices 202-212 may be used to download disk images from the server 214 for use as set forth herein.

Figure 3:
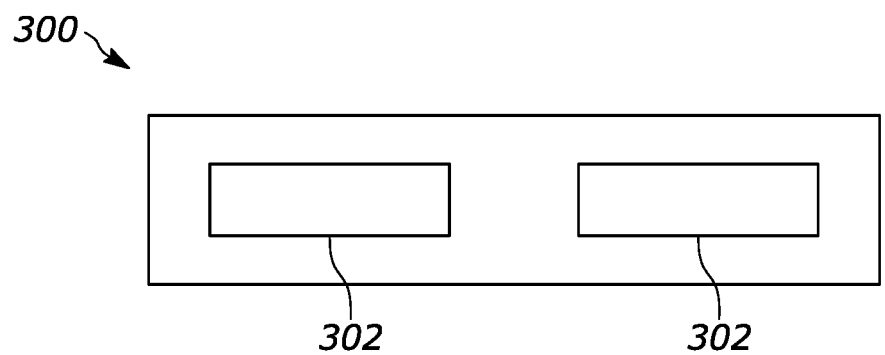
FIG. 3 shows a side elevational view of an example device having example universal serial bus (USB) ports that may be used to communicate with another device consistent with present principles.

Now describing FIG. 3, it shows a side elevational view of an example mobile device 300 that may communicate over the network 200 consistent with present principles. The mobile device 300 may be established by, for example, a laptop computer, a smartphone, a wearable device, or a tablet computer.

As shown, in addition to having a Wi-Fi transceiver or other network transceiver for communicating over the network 200, the mobile device 300 may have one or more ports 302 at which a wire or cable can be plugged in for the mobile device 300 to communicate with another computer via wired communication consistent with present principles. For example, the ports 302 may be universal serial bus (USB) ports for communicating with the other computer over a USB cable connected to a USB port on the other computer. While the ports 302 are shown as traditional USB ports (e.g., USB-A type ports), also note that wireless USB, micro USB, and other communication protocols may be used and accordingly the ports 302 may be configured for accommodating such connections (e.g., configured for receiving a wireless USB transceiver). Additionally, note that ethernet communication using an ethernet cable plugged into respective ports on the mobile device and other computer may also be used. Coaxial cables and fiber optic cables may also be used, as may other cables and cable types.

Figure 4:
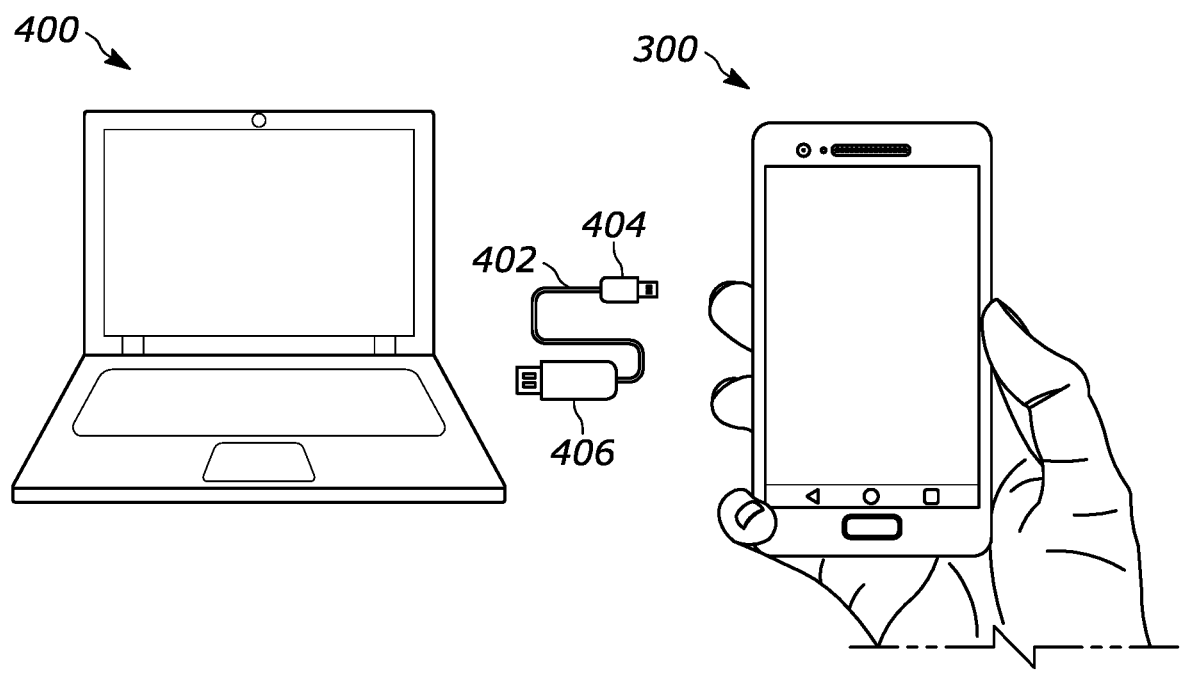
FIG. 4 shows a schematic view of two example devices that may communicate over a wired connection consistent with present principles.

FIG. 4 further illustrates. The mobile device 300, a smart phone in this example, may be connected to another computer 400 that is to be diagnosed using the mobile device 300. In this case, the computer 400 is a laptop computer.

As shown, a cable or wire 402 may connect the two devices for communication, where in this example the connection is established via a micro USB plug 404 on one end of the cable 402 hat may be plugged into a micro USB port on the mobile device 300 (e.g., USB-C type port). Located on the other end of the cable 402 may be a traditional USB plug 406 to be plugged into a traditional USB port on the computer 400 (e.g., USB-A type port). Once the cable 402 is plugged into the corresponding ports on each device, wired communication between the two devices 300, 400 may ensue as reflected in FIG. 5.

Figure 5:
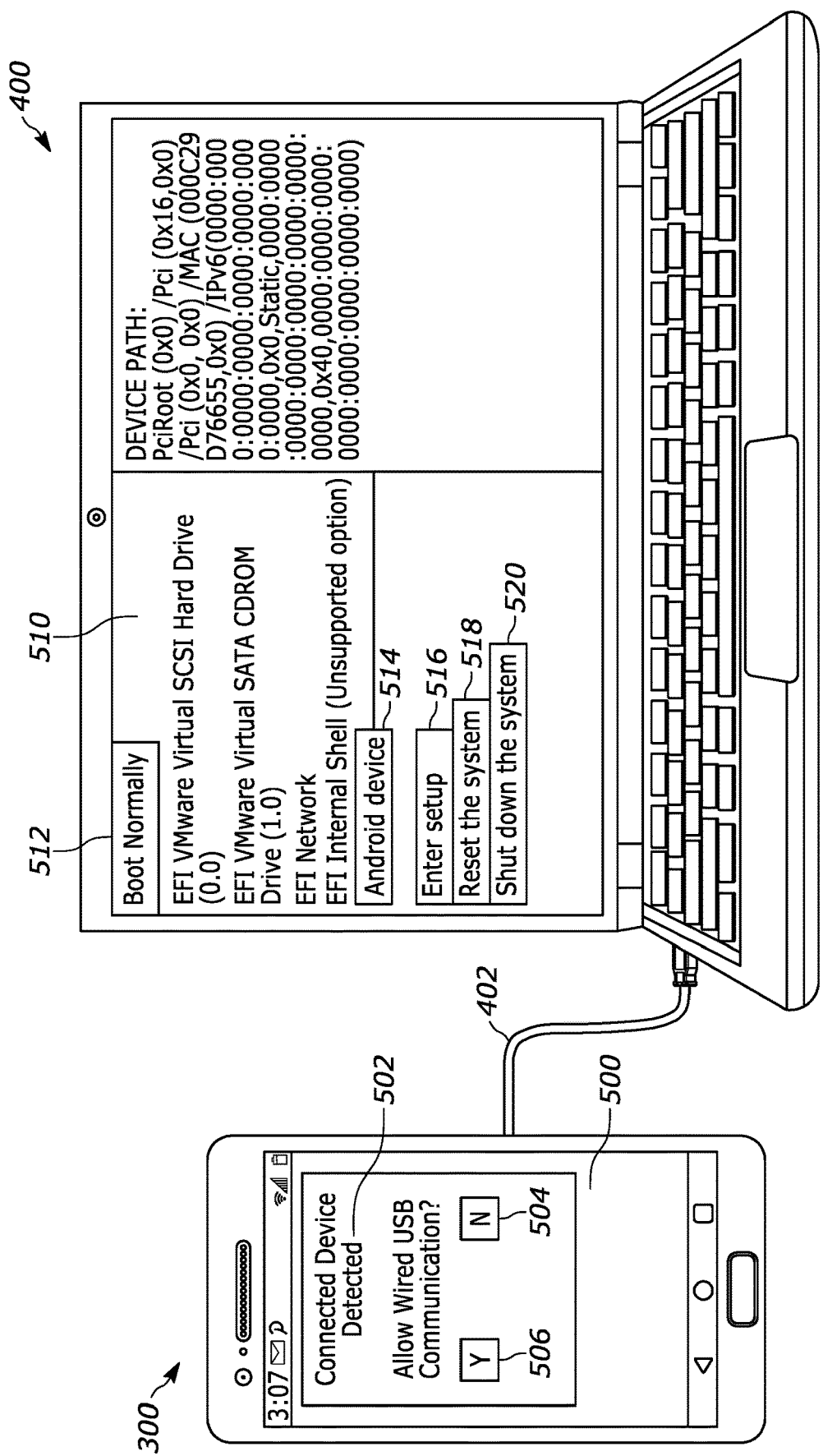
FIG. 5 shows example graphical user interfaces (GUIs) that may be presented on the display of each device responsive to detecting a wired connection in order to authorize communication between the two devices over the wired connection consistent with present principles.

Accordingly, as shown in FIG. 5, responsive to the mobile device 300 detecting a wired connection to the computer 400 (e.g., which may be based on detecting electrical signal or communications across the cable 402), the device 300 may present a graphical user interface (GUI) 500 on its electronic display as shown. The GUI 500 may include a prompt 502 indicating that a wired connection to computer 400 has been detected and asking the end-user, technician, or system administrator whether that person would like to allow or authorize the device 300 to communicate with the computer 400 over the wired connection 402.

As also shown, the GUI 500 may include a first selector 504 that may be selectable via touch or cursor input to decline to authorize the communication. The GUI 500 may also include a second selector 506 that may be selectable to authorize the communication between the device 300 and computer 400 over the wired connection 402. Communication may be authorized to transmit a disk image and other data as will be described further below. Also note that in some examples the GUI 500 may include username and password fields for the end-user, technician, or system administrator to also sign in to a secure account or storage area for running computer diagnostics consistent with present principles.

Still in reference to FIG. 5, in some examples where a disk image is to be autonomously identified and transmitted to the computer 400 over the connection 402, the device 300 may do so responsive to selection of the selector 506. However, in other example implementations additional input from the end-user, technician, or system administrator may be requested first, as will be described in later figures.

But first, note that FIG. 5 also shows that the electronic display of the computer 400 may also present its own GUI 510 responsive to the computer 400 also detecting the wired connection 402 to the device 300. For example, the computer 400 may have received a boot command (e.g., based on selection of a power button on the computer 400), which in turn may have caused a Unified Extensible Firmware Interface (UEFI) driver or other driver type as stored at the computer 400 to load and present the GUI 510. Note that the driver may also be configured to be compatible for communication with a specific diagnostic application on the device 300, for example, as will be discussed further below.

The driver itself may have been pre-installed at the computer 400 by the manufacturer of the computer 400, or a technician or system administrator. Additionally, note that the driver may be configured for detecting wired connections outside of execution of one or more guest operating systems (GOSs) on the computer 400, possibly prior to the loading and executing the GOS itself. For example, the driver may load and execute pre-GOS to present the GUI 510 prior to the computer 400 loading and/or executing a GOS pre-stored locally at the computer 400, whether the GOS be Windows, Android, Mac OS, or another. Accordingly, the GUI 510 may be presented pre-GOS using the native operating system of the computer 400, such as its BIOS and/or UEFI firmware.

As also shown in FIG. 5, the GUI 510 may include an option 512 that may be selected by the end-user, technician, or system administrator to command the computer 400 to boot as it normally would by loading and executing the GOS stored locally at the computer 400. However, the GUI 510 may also include a prompt or indication 514 that a connected device has been detected (the device 300 in this case). The indication 514 may be accompanied by a selector 516 that may be selectable to command or authorize communication between the device 300 and computer 400 over the wired connection 402 for receiving a disk image from the device 300 to load into the computer 400 to continue booting the computer 400. The selector 516 may be selectable via touch, cursor, or keyboard input, for example.

The disk image itself may contain, for example, contents and structure of a disk volume or storage device such as a hard disk drive, flash drive, or solid-state drive. As such, the disk image may contain a copy of one or more guest operating systems such as Windows, macOS, Android, or Linux, along with individual files like multimedia files and individual software applications such as diagnostic or antivirus software applications that may be used for diagnosing the computer 400 consistent with present principles. Thus, selection of the selector 516 may command the computer 400 to not just authorize the wired communication with the device 300 but to also load and execute a GOS contained in a received disk image from the device 300 rather than loading the GOS already stored locally at the computer 400 itself.

However, as also shown in FIG. 5, note that the GUI 510 may include selectors 518 and 520 as well. Selector 518 may be selected to command the computer 400 to reset, such as by reformatting its hard disk drive, deleting all user data, and/or booting from an initial version of the system as provided by the computer's manufacturer. Selector 520 may also be selected to instead issue a shutdown command to power the computer 400 off.

Figure 6:
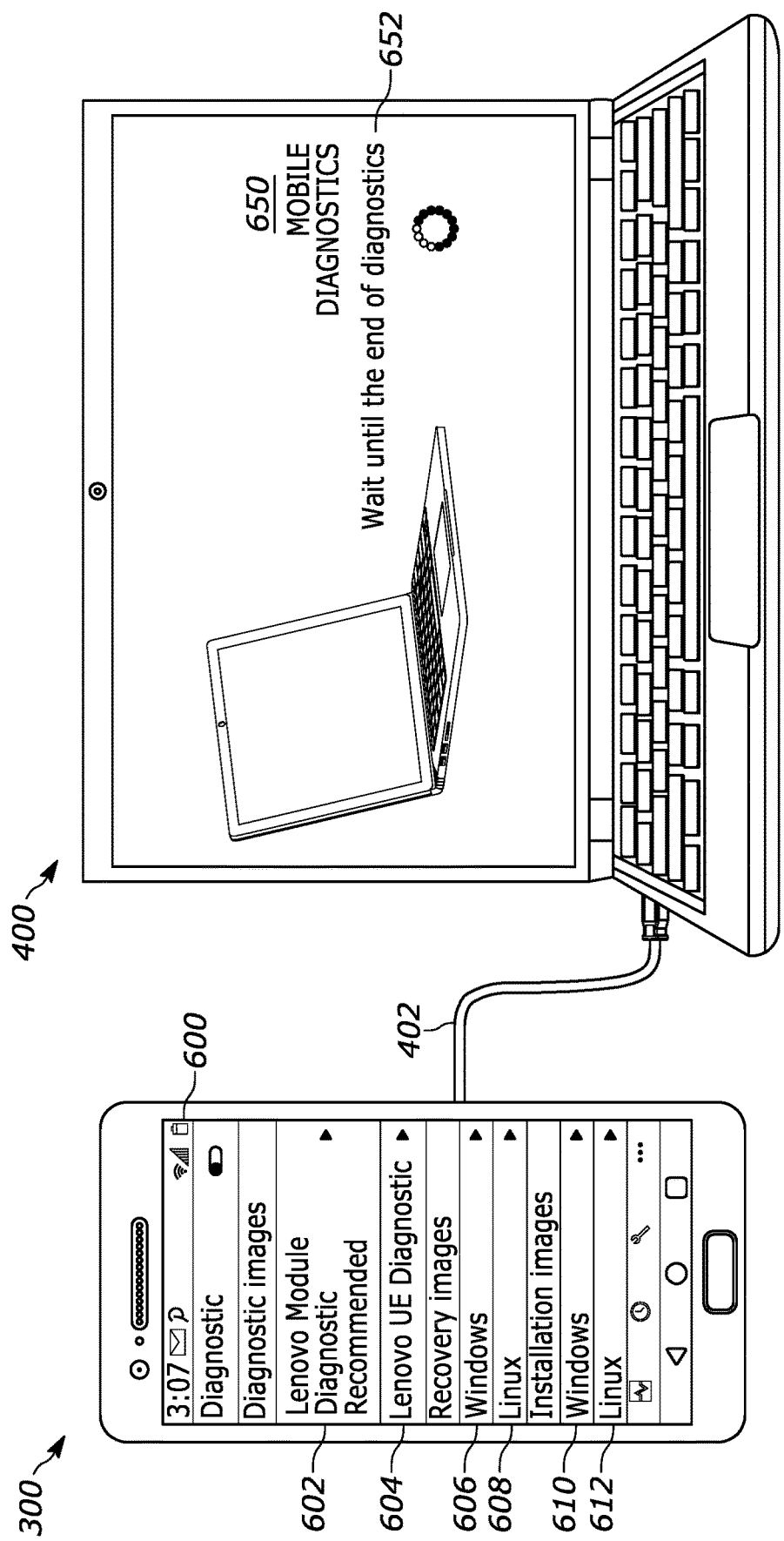
FIGS. 6-12 show various example GUIs that may be presented during the process of selecting and transmitting disk images and diagnostic commands between devices over a wired connection consistent with present principles.

Reference is now made to FIG. 6 where, assuming wired communication has been authorized at one or both of the device 300 and computer 400 as described above, the device 300 may present a GUI 600 while the computer 400 may present a GUI 650. As shown in FIG. 6, the GUI 600 may include various selectors to select different types of disk images to send to the computer 400 over the wired connection 402, where the UEFI or other driver executing at the computer 400 might be awaiting the disk image. For example, selectors 602, 604 may be selected to select different types of available diagnostic images to send for execution of corresponding diagnostic software included in the diagnostic images. Selectors 606, 608 may be selected to select different types of available recovery images to send (e.g., to recover a particular GOS or other software as corrupted at the computer 400), and selectors 610, 612 may be selected to select different types of available installation images to send (e.g., to install or reinstall a particular GOS or other software).

The respective disk image associated with each respective selector 602-612 may already be stored at the device 300 based on the device 300 automatically downloading disk image updates or new versions on a recurring basis, such as every hour. Additionally or alternatively, one or more of the disk images associated with a respective selector 602-612 may be available for download by the device 300 but not yet downloaded until the associated selector is selected, which in turn may cause download of the associated disk image by the device 300 and then transmission to the computer 400 over the wired connection. But regardless of whether the disk images have already been downloaded by the device 300 or will be downloaded, note that the disk images themselves that are recommended via the selectors 602-612 may have been determined based on the computer 400 reporting its parameters over the wired connection 402 to the device 300, such as system specifications (e.g., processor model and type, RAM type, etc.) as well as GOS type and version for the GOS stored locally at the computer 400. Based on the reporting, the device 300 and/or a remotely-located server in communication with the device 300 may then select one or more disk images to download and then associate them with respective selectors 602-612 so that those images would be selectable and then useable by the computer 400 to load and have itself diagnosed by the device 300.

For example, the computer 400 may report over the wired connection 402 that it uses a particular version of Windows as its GOS, as defined by a most-recent Windows update. The device 300 may then download one or more disk images that may be used with that version of Windows, including as a disk image having the same Windows version as the one reported by the computer 400.

Additionally, note that while the end-user, technician, or system administrator is deciding which selection to make from amongst the selectors 602-612, the GUI 650 may remain presented on the display of the computer 400. As shown, the GUI 650 may include a prompt 652 that mobile diagnostics are being performed and that the user is to wait until its completion before being able to use the computer 400 as the user normally would.

Figure 7:
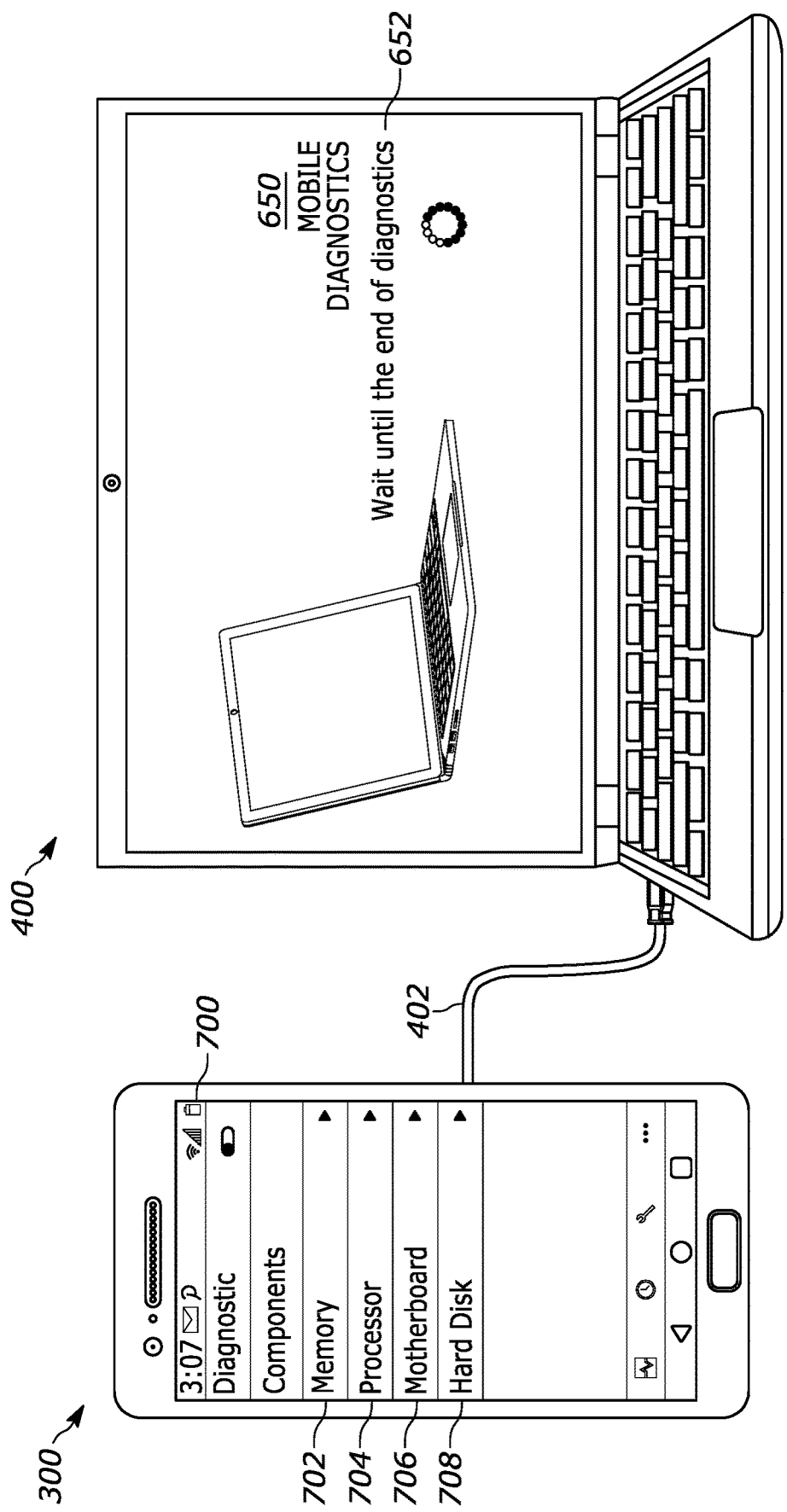

Continuing now in reference to FIG. 7, it shows another example GUI 700 that may be presented on the display of the device 300. Further, per FIG. 7 the GUI 650 may continue to be presented on the display of the computer 400 while the pre-GOS driver on the computer 400 waits for diagnostic disk images, commands, etc. from the device 300.

The GUI 700 itself may be presented responsive to the device 300 sending a particular diagnostic image selected from the GUI 600 to the computer 400, and/or responsive to receiving a message from the computer 400 that the selected diagnostic image (and its associated GOS) have been loaded into the computer 400 as sent from the device 300 over the wired connection 402.

As also shown in FIG. 7, once presented the GUI 700 may include selectors 702, 704, 706, and 708. Each of those selectors may be selectable to send a particular diagnostic command to the computer 400 over the wired connection 402, and/or may be selectable to navigate to another screen for selecting another selector to issue such a command. Once received, selected commands may then be executed at the computer 400 using the diagnostic image and the GOS that the image contains, as was sent from the device 300 over the wired connection 402 and loaded into the computer 400 during the boot process.

If used to navigate to another screen as shown in the present example, each selector 702-708 as shown in FIG. 7 may present text indicating that the respective selector is selectable to navigate to a different type or class of diagnostic commands, including diagnostic RAM/memory commands (selector 702), diagnostic processor/CPU commands (selector 704), diagnostic motherboard commands (selector 706), and diagnostic hard disk drive/storage area commands (selector 708). Furthermore, since the computer 400 communicates with the device 300 via the wired connection 402, diagnostic data and information can be presented on the display of the device 300 even if the display on the computer 400 is malfunctioning or off so that the end-user, technician, or system administrator can still view the issues that were discovered by the diagnostic software via the wired connection 402.

Figure 8:
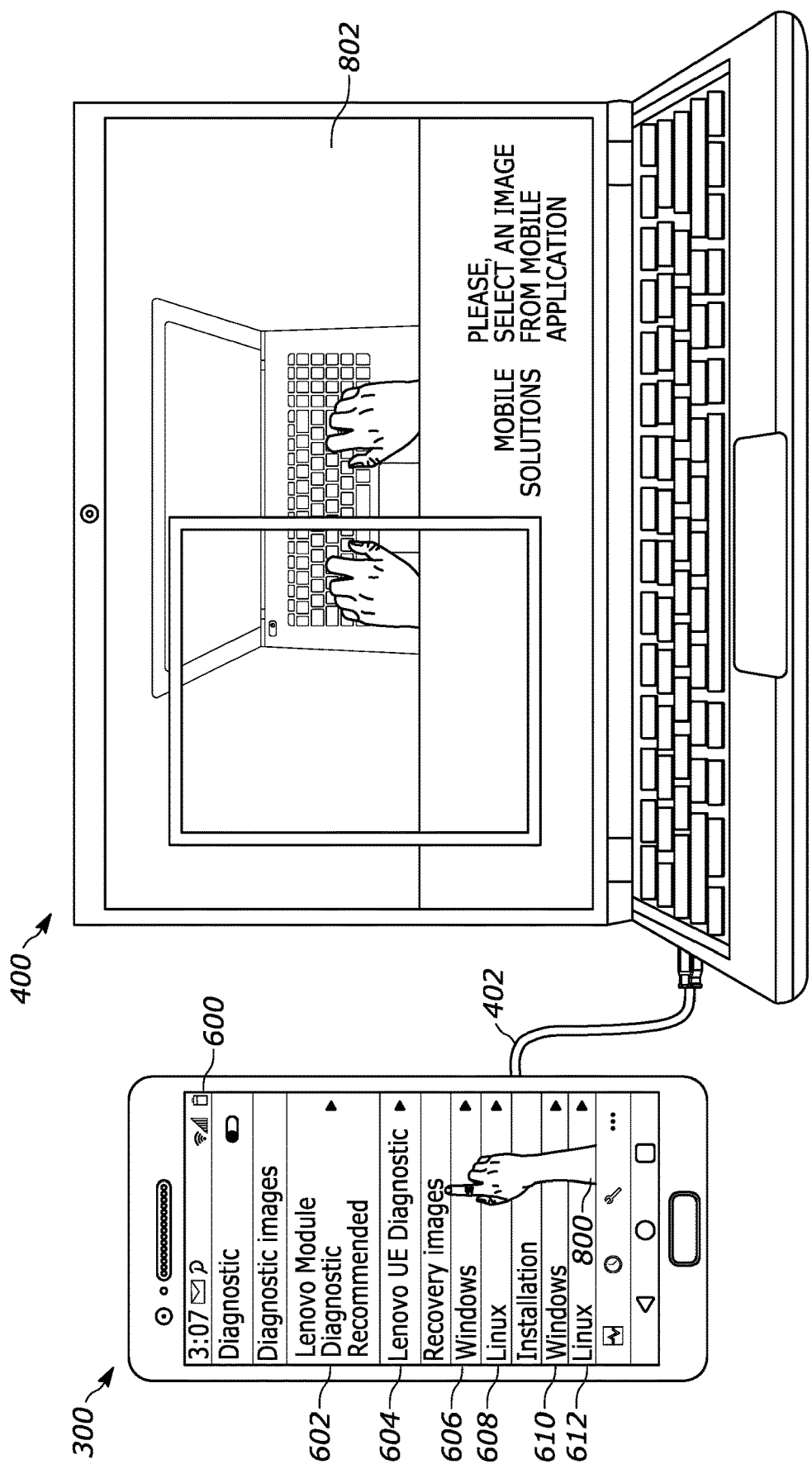

Continuing the detailed description in reference to FIG. 8, the GUI 600 is again shown as being presented on the display of the device 300. In this example, a person 800 such as the end-user, technician, or system administrator is shown as directing input to the GUI 600 to select a particular SO recovery image rather than a diagnostic image or installation image. The user 800 may have been prompted to do so via the GUI 802 presented on the display of the computer 400, which may have been presented by the UEFI driver executing at the computer 400 and may include text that an SO recovery image should be selected using an application executing at the device 300 (e.g., the same application that is being used to present the GUI 600). An "SO" recovery image may be a disk image with an .iso filename extension that itself is named after the International Organization for Standardization. As shown in FIG. 8, the selector 606 may be associated with SO recovery images of the Windows GOS type while selector 608 may be associated with SO recovery images of the Linux GOS type.

Figure 9:
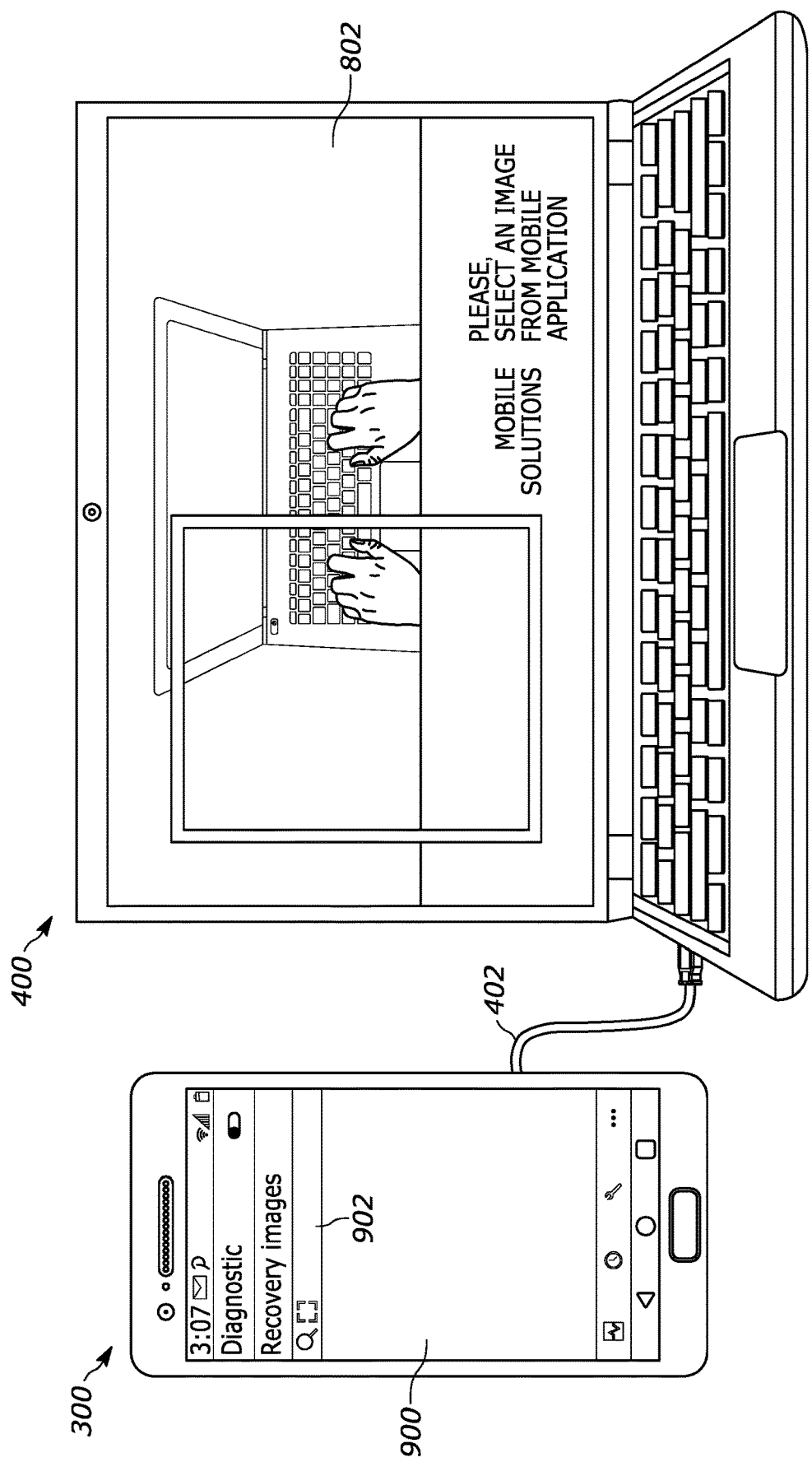

Then as shown in FIG. 9, responsive to the user selecting one of the selectors 606, 608, a GUI 900 may be presented on the display of the mobile device 300. The GUI 900 may include an entry field 902 into which the person 800 may type the serial number of the computer 400. Additionally, or alternatively, the field 902 may be used to scan or upload a photograph of the serial number as displayed on an outer surface of the computer 400 and photographed using a camera on the device 300.

Figure 10:
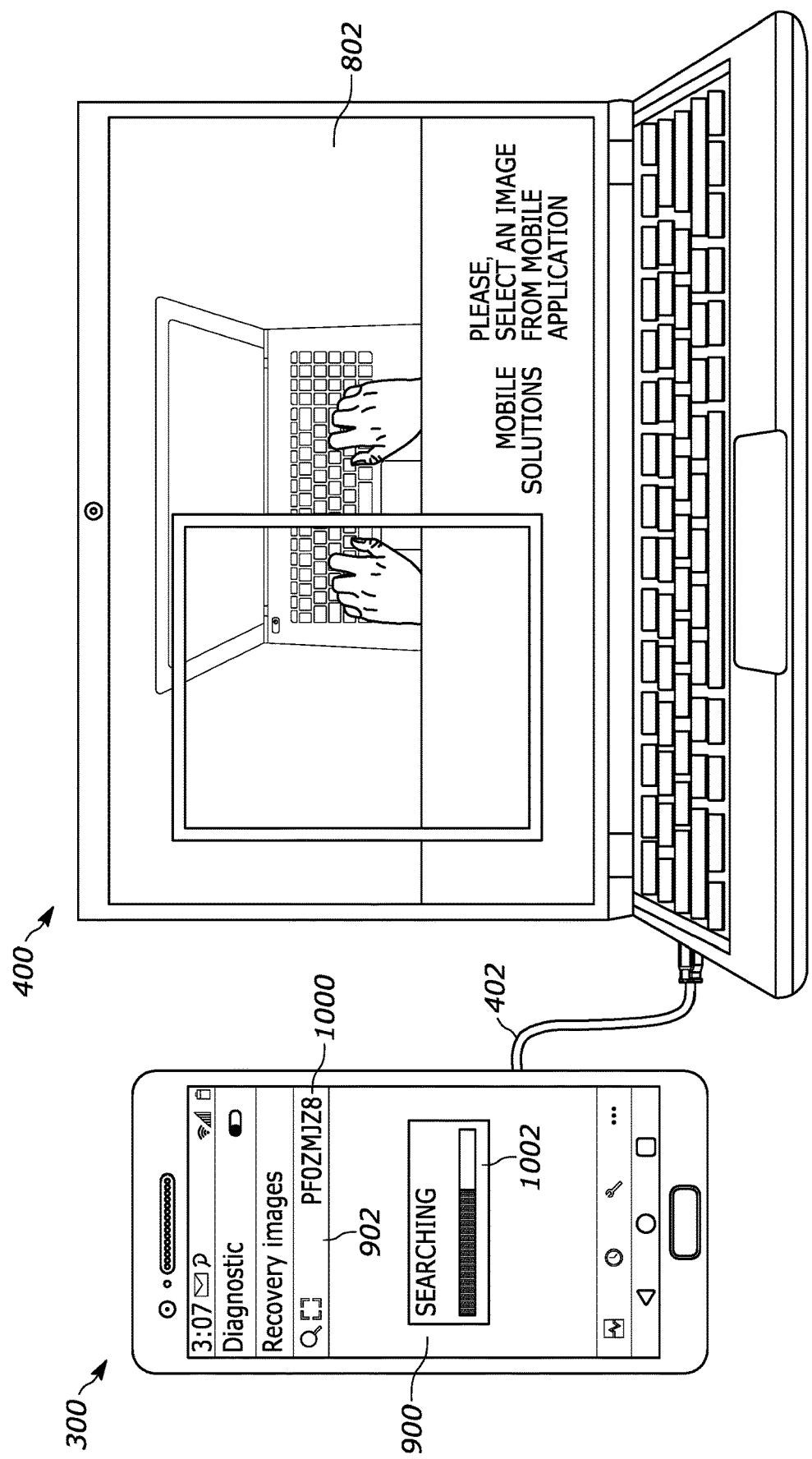

Then, responsive to entry of a serial number 1000 into the field 902 as shown in FIG. 10, the device 300 may present a pop-up box 1002 on top of the GUI 900 to indicate that the mobile device 300 is searching a relational database or other source for an SO recovery image already associated with the serial number 1000 by the manufacturer of the computer 400 or another person such as a system administrator or technician. The relational database may be stored at a remotely-located server and/or locally at the device 300 as part of the diagnostic software running on the device 300 to diagnose the computer 400, for example.

Figure 11:
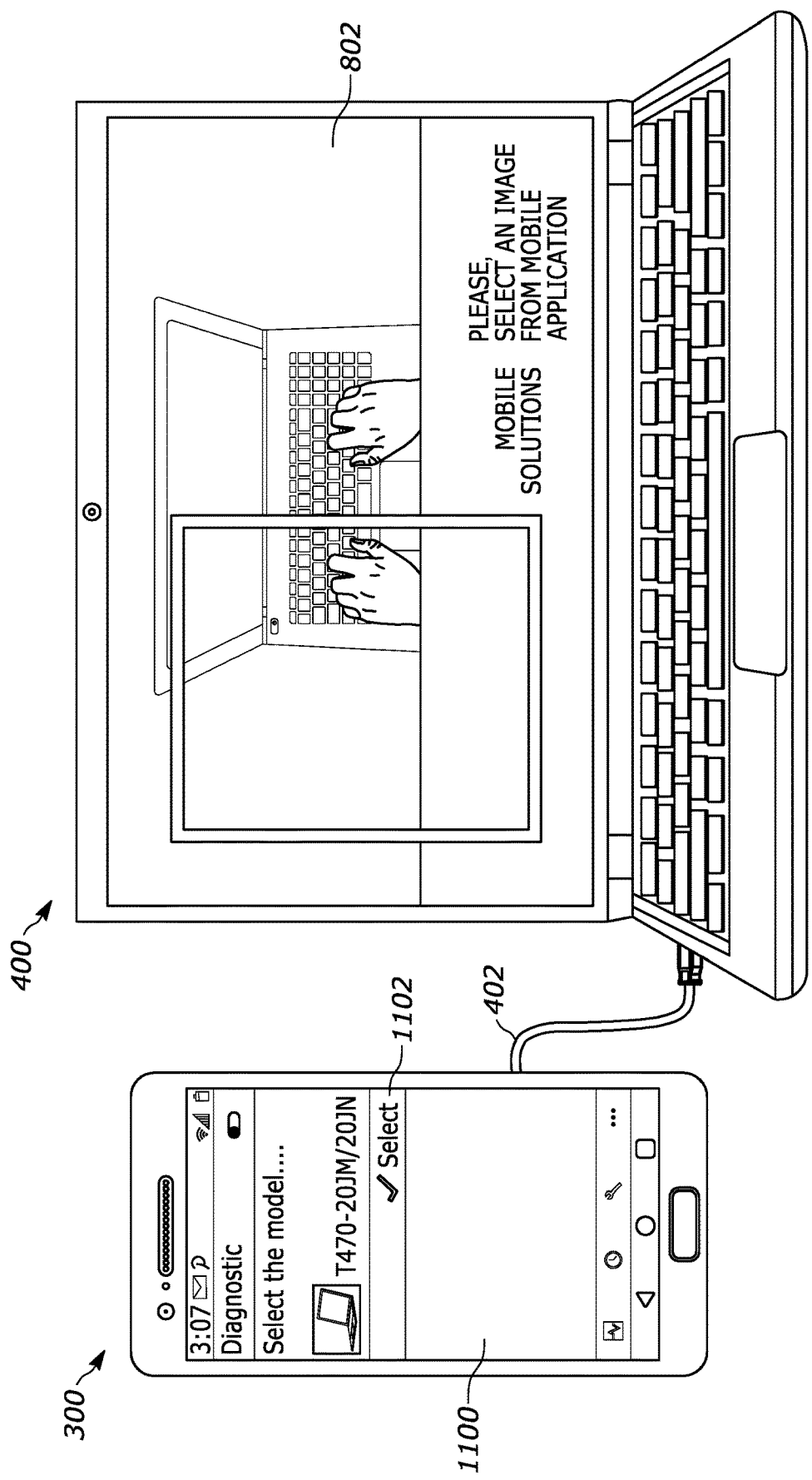

Once the device 300 identifies a particular SO recovery image via the search and using the serial number, the device 300 may begin to automatically download it (if not already stored locally) and, as shown in FIG. 11, a GUI 1100 may be presented on the display of the device 300. The GUI 1100 may include a selector 1102 that may selectable to transmit the downloaded SO recovery image that was identified from the search (and indicated on the GUI 1100 as shown) to the computer 400 over the wired connection 402.

Figure 12:
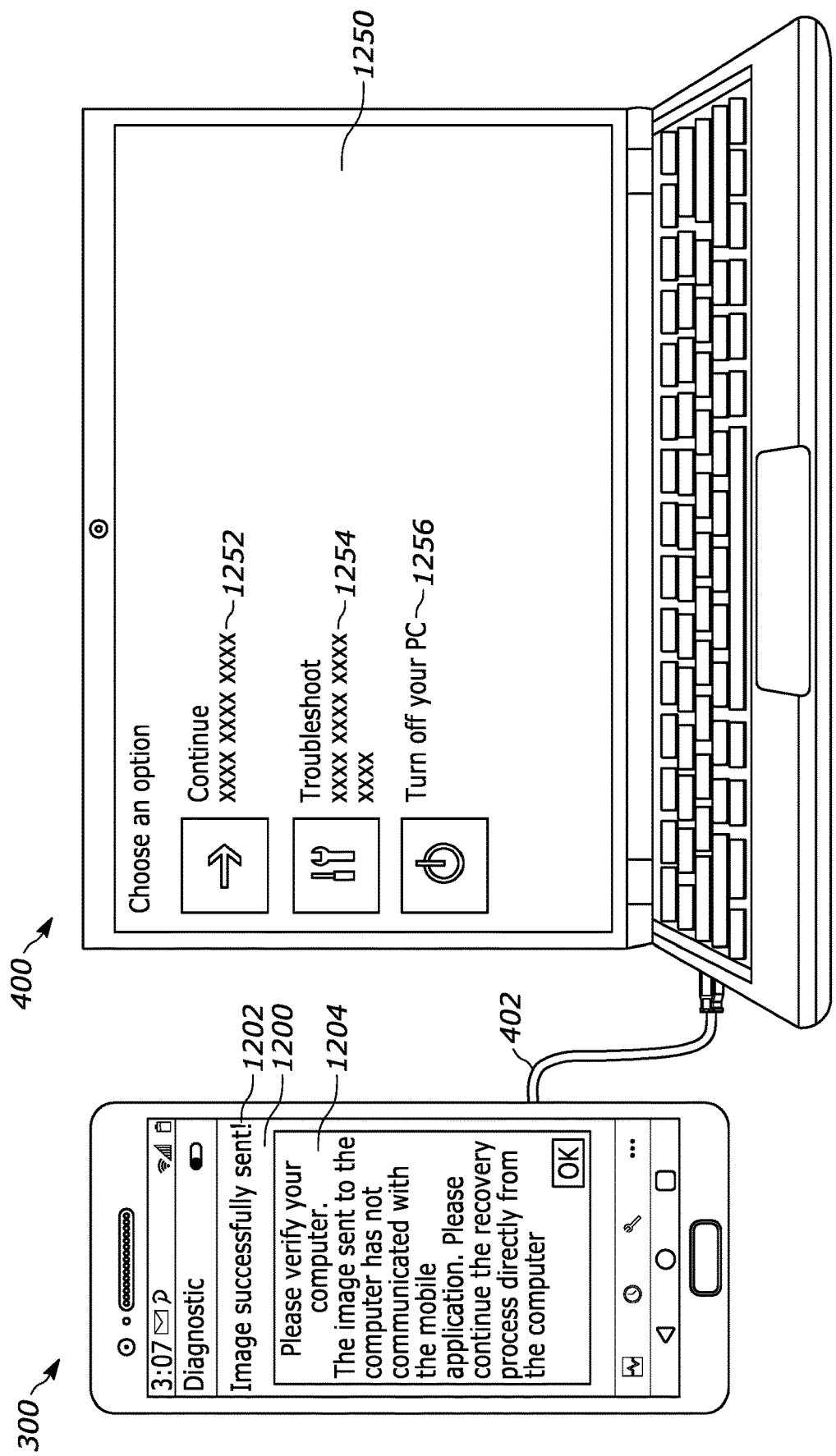

Responsive to receiving an indication over the wired connection 402 that the computer 400 has successfully received the SO recovery image from the device 300, the GUI 1200 that is shown in FIG. 12 may be presented on the display of the device 300. The GUI 1200 may include a first prompt 1202 indicating that the SO recovery image was successfully sent.

The GUI 1200 may also include a second prompt 1204. The prompt 1204 may indicate that the SO recovery image sent to the computer 400 has not yet begun communicating with the device 300 to perform diagnostics on the computer 400 and, as such, the person 800 should continue the "recovery process" at the computer 400.

As may also be appreciated from FIG. 12, to continue the "recovery process" at the computer 400 as instructed by the prompt 1204, the person 800 may be presented with various selectors via a GUI 1250 presented on the display of the computer 400. As shown on the GUI 1250, a first selector 1252 may be selectable to command or authorize the computer 400 to continue booting using the SO recovery image received from the device 300, including possibly loading a GOS included in the SO recovery image. However, the person 800 might also select the selector 1254 to initiate different troubleshooting software already stored locally at the computer 400, or select the selector 1256 to issue a command to turn off or power down the computer 400 without loading the SO recovery image received from the device 300. But assuming the selector 1252 was selected, the computer 400 may load the SO recovery image so that a diagnostic application running on the device 300 can diagnose the computer using the SO recovery image and fix any identified issues where possible.

Figure 13:
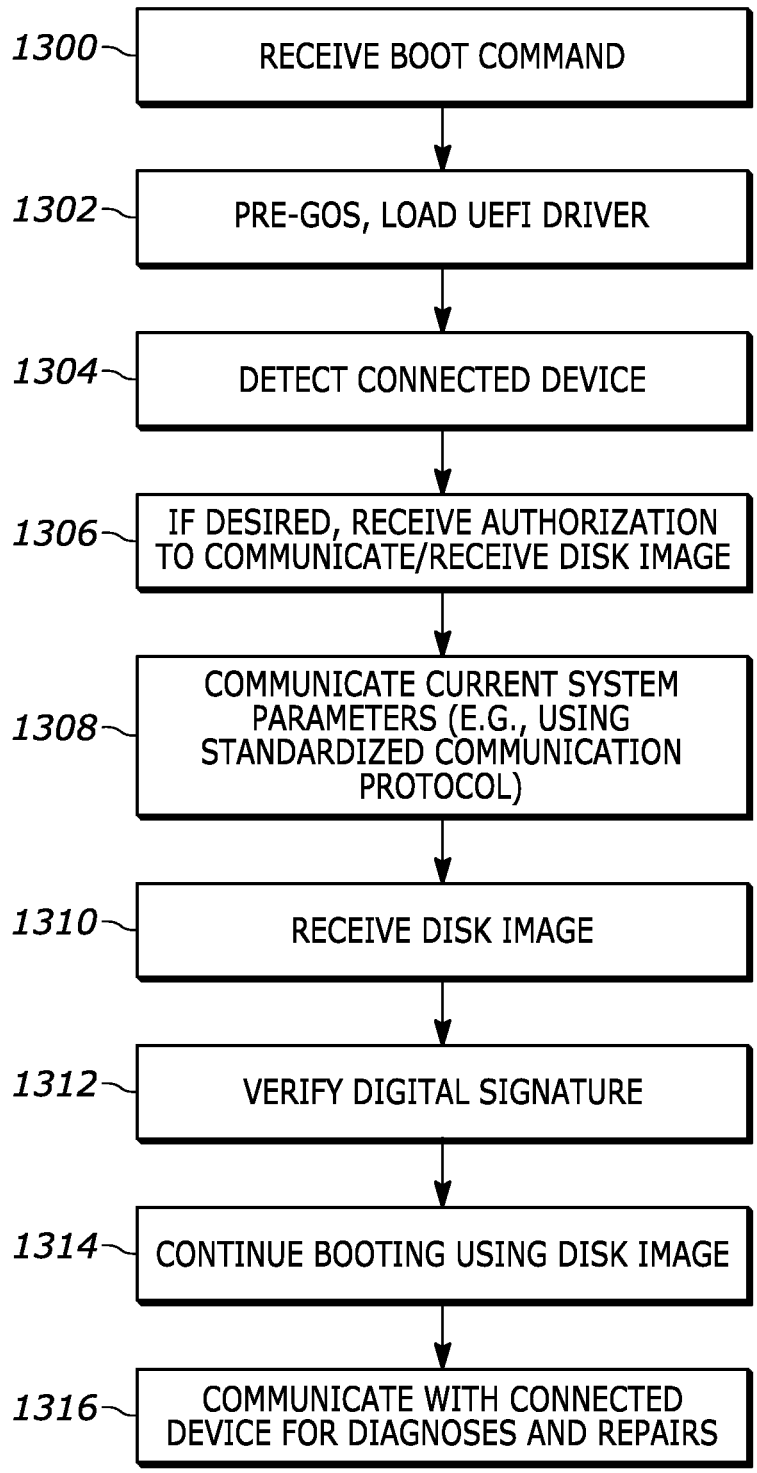
FIG. 13 shows a flow chart of an example algorithm that may be executed by a computer that is to be diagnosed and/or fixed consistent with present principles.

Continuing the detailed description in reference to FIG. 13, it shows example logic that may be executed by a computer such as the computer 400 consistent with present principles so that the computer can be diagnosed by a mobile device. Beginning at block 1300, the computer may receive a boot command such as responsive to a person pressing a power button on the computer 1300. From block 1300 the logic may proceed to block 1302.

At block 1302 the computer may, prior to loading any GOS already stored in its local storage, load a driver such as the UEFI driver described above. The logic may then continue to block 1304 where the computer, via the UEFI driver, may detect a connected mobile device via a USB cable or other wired connection as described above. From block 1304 the logic may then proceed directly to block 1308 or, in some examples, may first proceed to block 1306.

At block 1306, if desired the computer, via the UEFI driver, may present a prompt such as the prompt 514 and receive authorization to communicate with the detected device to receive a disk image. The authorization may have been provided by a person based on selection of the selector 516 described above, for example. Responsive to selection of the selector, the logic may then proceed to block 1308.

At block 1308 the computer, via the UEFI driver, may communicate its current system parameters to the other device to which it is connected. The current system parameters may be stored, for example, in read-only memory of the computer or another storage location. But regardless of where they are stored, the current system parameters may be accessible to the UEFI driver as loaded into the computer, pre-GOS. The parameters may include, for example, make and model number of the computer as well as serial number and information specifying the particular GOS(s) and other software stored at the computer. The parameters may be communicated by the UEFI driver at block 1308 using a standardized file-sharing communication protocol, such as Android Open Accessory Protocol 1.0 or 2.0.

Then, possibly also using the standardized communication protocol, the computer may via the UEFI driver receive a disk image from the connected device that matches or is compatible with the parameters transmitted at block 1308. In some examples, the disk image may be received with a digital signature from the connected device. In these examples, the logic may proceed to block 1312 where the UEFI driver may verify the digital signature of the other device using the appropriate decryption key to further improve security before the logic proceeds to block 1314, or in some examples if no digital signature accompanied the disk image then the logic may proceed directly to block 1314 (e.g., since verifying the digital signature may not be required in some implementations).

At block 1314 the computer may continue its boot process using the received disk image, e.g., to boot a GOS included in the received disk image rather than booting a GOS already stored locally at the computer prior to the connection to the connected device. From block 1314 the logic may then proceed to block 1316. At block 1316 the computer may continue communicating with the connected device (e.g., using the standardized communication protocol and/or UEFI driver) in order to assist the connected device in diagnosing any problems with the computer. The diagnosis software may be executed at the connected device or at the computer itself if included in the received disk image. Additionally or alternatively, compatible diagnostic software may run on both devices for performing the diagnoses.

Figure 14:
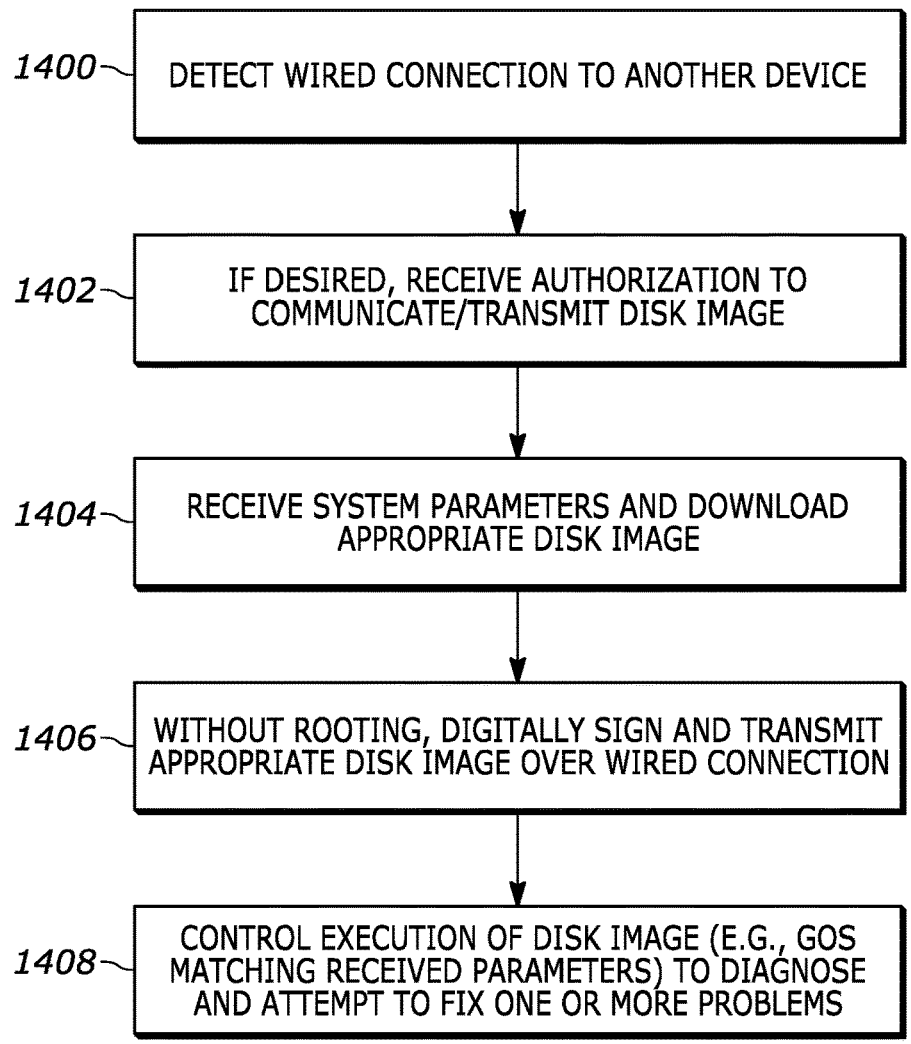
FIG. 14 shows a flow chart of an example algorithm that may be executed by a mobile device that is to transmit a disk image over a wired connection to another computer that is to be diagnosed and/or fixed consistent with present principles.

Referring now to FIG. 14, it shows example logic that may be executed by the connected device itself, which may be the mobile device 300 described above for example. Beginning at block 1400, the mobile device may also detect the wired connection between it and the computer. The logic may then either proceed directly to block 1404 or, in some examples, first move to block 1402. At block 1402 the mobile device may present a prompt such as the prompt 502 described above and receive authorization to communicate with the connected computer to transmit a disk image to the connected computer. The authorization may have been provided by a person based on selection of the selector 506 described above, for example. Responsive to selection of the selector, the logic may then proceed to block 1404.

At block 1404 the mobile device may communicate with the connected computer using a standardized communication protocol as discussed herein to receive system parameters from the connected computer. Once the parameters are received, at block 1404 the mobile device may also search for and download the corresponding disk image for the received parameters. Note that the disk image that is downloaded may also match a request from the user, such as the request being for a diagnostic or SO image (but in either case may still match or be compatible with the received system parameters). From block 1404 the logic may then proceed to block 1406.

At block 1406 the mobile device may digitally sign the downloaded disk image and transmit it to the connected computer over the wired connection and using standardized communication protocol. By using the wired connection and standardized communication protocol to provide the disk image and digital signature (e.g., using a diagnostic software application executed by a GOS on the mobile device), the mobile device need not be rooted as it might otherwise would in order to achieve the type of elevated permission level that might otherwise be needed to communicate disk images to the connected computer.

From block 1406 the logic may then proceed to block 1408. At block 1408 the mobile device may control execution of the disk image at the connected computer over the wired connection to diagnose and possibly attempt to fix one or more problems with the connected computer. So, for example, the mobile device may control execution of a GOS at the connected computer that was included as part of the disk image.

The problems themselves that may be identified and possibly fixed may be, for example, defective or malfunctioning software like operating systems and hardware drivers that may be infected with viruses (where the virus may be removed/deleted, or the infected software itself may be deleted and re-installed). Defective drivers may also be repaired, updated, and/or reinstalled. Other example problems may relate to issues with the device's hardware itself.

Also, note that at block 1408 the mobile device may also generate and present a report on its display to indicate to the system administrator, technician, or other person the issue(s) that have been detected, whether the issues have been fixed, and how they have been fixed if the diagnostic software was able to do so. For example, if a hardware component like a network transceiver, storage device, or port is defective and cannot be fixed, then at block 1408 the mobile device may generate a report that may be presented on its display to indicate the respective hardware issue but that it could not be fixed by the diagnostic software itself. As another example, if viruses were removed from the connected computer, the report may indicate the filename of the virus and at what time of day it was deleted/removed from the connected computer.

Thus, by executing the logic of FIG. 14, the mobile device may be used to diagnose and possibly fix problems with the connected computer even if the connected computer's own display is not working or if other parts of the connected computer are not healthy. The mobile device need not be rooted to do so, but the mobile device may still be used to control the connected computer through a standardized application programming interface (API)/communication protocol and driver executing at the connected computer.

Figure 15:
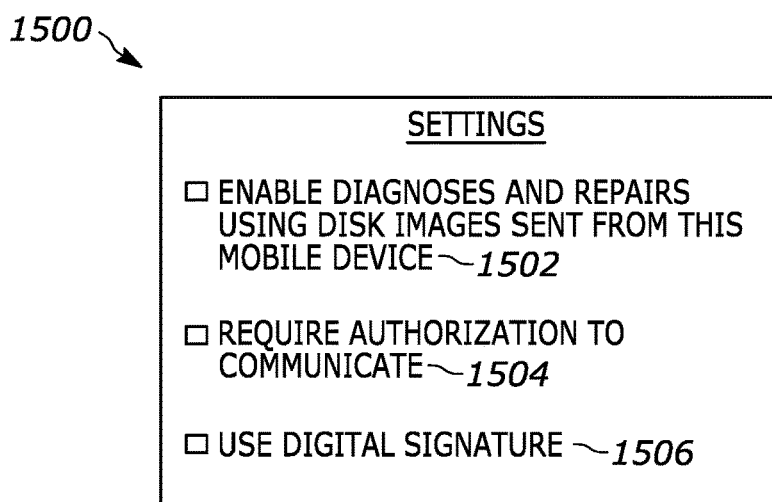
FIG. 15 shows an example settings GUI that may be presented on a display of the mobile device to configure one or more settings of the mobile device consistent with present principles.

Now referring to FIG. 15, it shows an example GUI 1500 that may be presented on the display of the mobile device configured to execute the logic of FIG. 14. The GUI 1500 may be used for configuring one or more settings of the mobile device, and as such each respective setting to be discussed below may be selected by directing touch or cursor input to the respective check box shown adjacent to the respective option.

As shown in FIG. 15, the GUI 1500 may include a first setting 1502 that may be selected to set or enable the mobile device to undertake present principles. For example, the setting 1502 may be selected to set or configure the mobile device to in the future undertake the logic of FIG. 14 and/or undertake other functions described above to diagnose another computer.

As also shown in FIG. 15, the GUI 1500 may include a setting 1504 that may be selectable to require user input authorizing the mobile device to communicate with a connected device before actually doing so. However, if the setting 1504 is not selected, the mobile device may communicate with a connected device without receiving user authorization.

The GUI 1500 may further include an option 1506 that may be selectable to command the mobile device to use digital signatures when providing disk images to connected devices so that the connected devices can verify that the disk images came from a trusted source prior to loading them.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
responsive to a boot command, load a driver, the driver being loaded prior to the first device loading a guest operating system (GOS) stored at the first device;
use the driver to communicate with a second device to report one or more parameters of the first device to the second device and to receive a disk image over a wired connection to the second device, the disk image being compatible with the one or more reported parameters, the second device being different from the first device, the one or more parameters relating to one or more of: a type of processor in the first device, a model of processor in the device, a type of random access memory (RAM) in the first device, a make of the first device, a model number of the first device, a serial number of the first device;
continue booting the first device using the disk image rather than the GOS; and
responsive to the first device being booted using the disk image, communicate with the second device over the wired connection to diagnose one or more issues with the first device.

2. The first device of claim 1, wherein the instructions are executable to:
responsive to the first device being booted using the disk image, communicate with the second device over the wired connection for diagnosing and fixing the one or more issues with the first device.

3. The first device of claim 1, wherein the driver is a Unified Extensible Firmware Interface (UEFI) driver.

4. The first device of claim 1, wherein the reported system parameters are accessed by the at least one processor from read-only memory of the first device.

5. The first device of claim 1, wherein the one or more parameters relate at least to the serial number of the first device, and wherein the disk image is an .iso recovery image that is associated with the serial number.

6. The first device of claim 1, wherein the instructions are executable to:
receive a digital signature signing the received disk image and verify the digital signature using a key; and
responsive to verifying the digital signature signing the disk image, continue booting the first device using the disk image.

7. A method, comprising:
responsive to receiving a boot command at a first device, loading a driver at the first device;
using the driver to communicate with a second device to report one or more parameters of the first device to the second device and to receive a disk image that is compatible with the one or more parameters, the second device being different from the first device, the one or more parameters relating to one or more of: a type of processor in the first device, a model of processor in the device, a type of random access memory (RAM) in the first device, a make of the first device, a model number of the first device, a serial number of the first device;

receiving a digital signature signing the received disk image and verifying the digital signature using a key;

responsive to verifying the digital signature signing the disk image, booting the first device using the disk image rather than a guest operating system (GOS) stored at the first device; and responsive to the first device being booted using the disk image, communicating with the second device to diagnose one or more issues with the first device.

8. The method of claim 7, wherein the one or more parameters relate to one or more of: a type of processor in the first device, a model of processor in the device.

9. The method of claim 7, wherein the one or more parameters relate to one or more of: a type of random access memory (RAM) in the first device.

10. The method of claim 7, wherein the one or more parameters relate to one or more of: a make of the first device, a model number of the first device.

11. The method of claim 7, wherein the one or more parameters relate at least to the serial number of the first device, and wherein the disk image is a recovery image that is associated with the serial number.

12. At least one computer readable storage medium (CRSM) that is not a transitory signal, the computer readable storage medium comprising instructions executable by at least one processor to:

detect, at a first device, a wired connection to a second device different from the first device;

present a graphical user interface (GUI) on a display accessible to the at least one processor, the GUI comprising a field to upload a photograph of a serial number of the second device as photographed using a camera on the first device;

search a database to identify an .iso recovery disk image as associated in the database with the serial number indicated via the photograph;

based on identifying the .iso recovery disk image, download the .iso recovery disk image;

based on detecting the wired connection, transmit the .iso recovery disk image to the second device over the wired connection; and control, from the first device and over the wired connection, execution of the .iso recovery disk image as loaded at the second device to diagnose and attempt to fix one or more problems with the second device;

wherein the first device is a mobile device, wherein the wired connection comprises a universal serial bus (USB) wired connection, and wherein the .iso recovery disk image as transmitted to the second device is digitally signed by the first device.

13. The CRSM of claim 12, wherein the GUI is a first GUI, and wherein the instructions are executable to:

present a second GUI on the display accessible to the at least one processor, the second GUI comprising at least a first selector and a second selector, the first selector being selectable to navigate to a first type of diagnostic commands to diagnose the second device, the second selector being selectable to navigate to a second type of diagnostic commands to diagnose the second device.

14. The CRSM of claim 13, wherein the first and second types of diagnostic commands are selected from the group consisting of: diagnostic memory commands, diagnostic processor commands, diagnostic motherboard commands, diagnostic storage area commands.

15. The CRSM of claim 12, wherein the GUI is a first GUI, and wherein the instructions are executable to:

present a second GUI on the display, the second GUI comprising a selector that is selectable to command the first device to download the .iso recovery disk image and then transmit the .iso recovery disk image to the second device over the wired connection.

16. The CRSM of claim 12, wherein the .iso recovery disk image is identified by the first device for download based on one or more parameters of the second device as reported by the second device over the wired connection.

\* \* \* \* \*